Oct. 23, 1923.
A. J. SAVAGE
1,471,982
HAND TOOL FOR CULTIVATING AND SCARIFYING LAND
Filed March 10, 1922
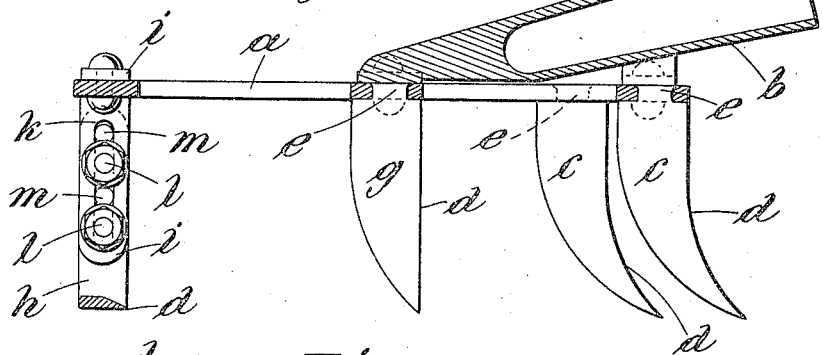
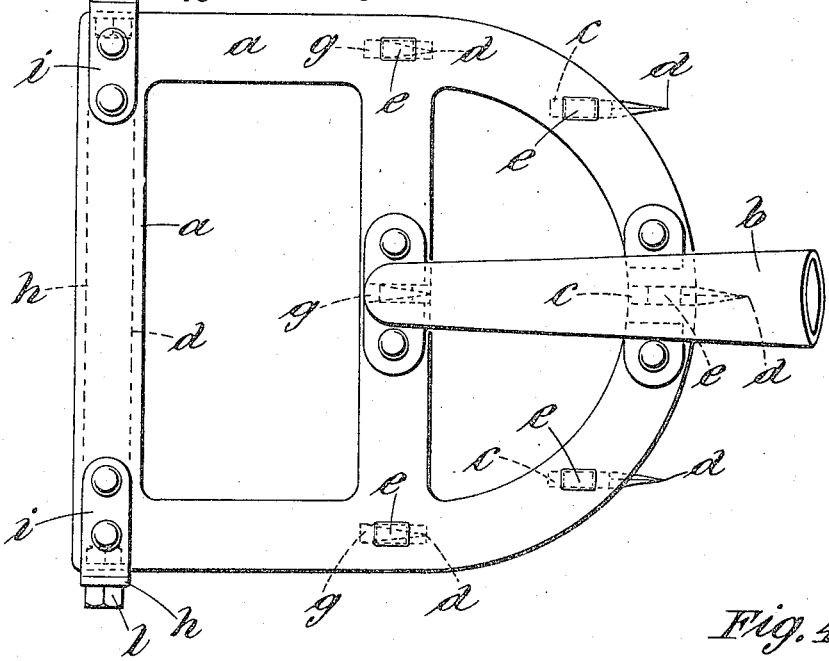
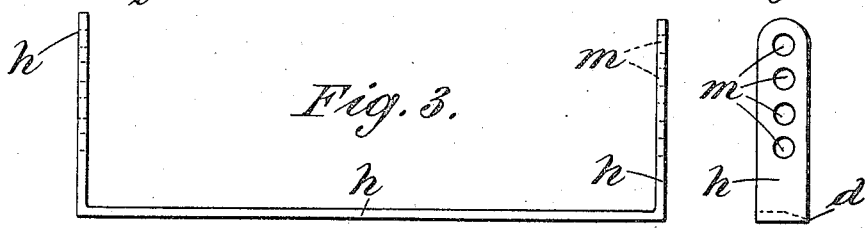

Patented Oct. 23, 1923.

1,471,982

UNITED STATES PATENT OFFICE.

ALFRED JAMES SAVAGE, OF WOLVERTON, ENGLAND.

HAND TOOL FOR CULTIVATING AND SCARIFYING LAND.

Application filed March 10, 1922. Serial No. 542,712.

*To all whom it may concern:*

Be it known that I, ALFRED JAMES SAVAGE, a subject of the King of Great Britain, residing at 44 Victoria Street Wolverton, Bucks, England, have invented certain new and useful Improvements in Hand Tools for Cultivating and Scarifying Land, of which the following is a specification.

This invention relates to agricultural and horticultural implements, but more especially to a combined cultivator and rapid weed destroyer, by means of which I seek to render it possible to clear the ground of weeds between rows of various descriptions of growing vegetables and elsewhere, the operation occupying much less time than it has hitherto taken to accomplish under like conditions and over a similar area of ground, and with less personal effort. For example I have, at a practical trial, cleared a piece of ground of the kind above indicated in two hours, whereas it is computed that the same work effected in the ordinary manner would have taken eight hours to accomplish.

An implement or hand tool according to my present invention is constructed essentially after the following manner:—

A suitably shaped crown or carrier plate is furnished upon its upper surface with a socket by means of which an operating handle is attached to the implement.

A plurality of leading plough knives are suspended from the underside of the crown or carrier plate and are securely fixed thereto by any suitable means such as either by riveting or by bolts or screws. The said plough knives, are carried by the forward portion of the crown plate which lies under the handle socket and which preferably is rounded or semi-circular in plan. The plow knives therefore are not in line with one another. The said knives are curved downwardly and forwardly to a point, their number and size being dependent upon the size of the implement and its intended uses.

A row of trailing knives of similar construction but having preferably straight vertical cutting edges are carried by the crown plate in rear of the leading plow knives and are attached to the crown plate in a similar manner, their number being also dependent upon the size of the implement.

In rear of the trailing knives a horizontal destroyer knife is carried by suspending strips that are attached to the crown plate by means of nuts and bolts, screws, or by other suitable means. The said suspending strips may be formed each in two separate portions which overlap and may be pierced with slots or holes for bolts or screws.

It is estimated that the all round employment of this implement will effect a great saving of time and labour and also ensure greater efficiency in the work performed, as all weeds may be separated or cut say at about 2½ inches below the surface without undue exertion, the leading and the trailing knives breaking up and releasing the ground. I may construct the components above detailed of any suitable metal, either cast or wrought.

And in order that my invention may be better understood and carried into practical effect I will now describe a preferred embodiment of same with the aid of the accompanying drawings which are to be deemed part of this specification and to be read therewith as descriptive.

Throughout such drawings like letters of reference denote like parts.

Figure 1 is a longitudinal section of a tool embodying the invention. Figure 2 is a plan view of same. Figure 3 is an end view of the destroyer knife, and Figure 4 is a side view of such knife.

An implement or hand tool according to my present invention is constructed essentially after the following manner:—

A suitably shaped crown or carrier plate $a$ of iron, steel or preferably malleable cast iron, is furnished upon its upper surface with an operating handle socket $b$ of wrought or malleable cast iron, which is securely attached thereto by riveting or other means, or said socket may, if desired, be cast integrally with the crown plate.

An operating handle which is attached to the implement through the medium of the socket may be of any suitable pattern.

A plurality of forged or stamped leading plough knives $c$ of preferably tempered steel and having their cutting edges at $d$ are suspended from and securely fixed to the inner side of the carrier plate by riveting as shewn at $e$ or by any other convenient means.

The said knives which are carried by the semi-circular or leading portion of the crown plate, under the handle socket, are therefore not in line with one another, are curved downwardly and forwardly to a point, their number and size being dependent upon the size of the implement and its intended uses.

A row of trailing knives $q$ of similar material and construction but having straight vertical cutting edges $d$ are carried by the crown plate in rear of the leading plough knives and are attached to the crown plate $a$ in a similar manner their number and size being also dependent upon the size of the implement.

In rear of the trailing knives is a tempered steel horizontal destroyer knife $h$. The height of the cutting edge $d$ of the knife is adjustable in relation to the said fixed leading and trailing knives. The destroyer knife $h$ is carried by suspending strips which are attached to the crown plate by riveting, bolts and nuts, screws or other means. The suspending strips $i$ are preferably bent over the upper surface of the crown plate $a$ and riveted, as shewn, or bolted thereto. The suspending strips are slotted at $k$ for the admission of adjusting bolts $l$ which pass through bolt holes $m$ in the upturned sides of the destroyer knife $h$.

Fine adjustments of height may be effected by slacking off the bolts $l$ and raising or lowering the sides of the destroyer knife, the bolts being free to move up or down the slot $k$ in the suspending strips. When a wider adjustment is required it is necessary to withdraw the bolts and pass them through other suitable holes $m$.

Claim:

A cultivating or scarifying tool or implement consisting of a foundation plate having a handle socket attached thereto, a plurality of forwardly curved and pointed plow knives carried by said foundation plate, a plurality of trailing knives having stright forward vertical edges attached to said plate in the rear of said plow knives, downwardly projecting arms at the rear of said plate, and a destroyer knife having upturned ends adapted to rest against said arms, and apertures in said arms and upturned ends whereby the arms and ends may be adjustably attached together.

In testimony whereof I have hereunto set my hand.

ALFRED JAMES SAVAGE.